Patented Apr. 22, 1947

2,419,366

UNITED STATES PATENT OFFICE 2,419,366

(N'-ALKYLPIPERAZINO) ALKANOL ESTERS

Elmore Hathaway Northey and Martin Everett Hultquist, Bound Brook, N. J., assignors to American Cyanamid Company, New York, N. Y., a corporation of Maine No Drawing. Application April 8, 1942, Serial No. 438,116

5 Claims. (Cl. 260—268)

This case relates to esters of carbocyclic-substituted aliphatic carboxylic acids and an (N'alkylpiperazino) alkanol.

Tertiary aminoalcohol esters of various carbocyclic-substituted carboxylic acids are of considerable commercial importance, particularly with respect to the monobasic acids. The exact properties and consequently the uses to which they may be put depend upon the particular acid and particular aminoalcohol which go to make up the ester.

The new chemical compounds of the present invention are esters of a carbocyclic-substituted aliphatic carboxylic acid and one of the new (N'alkylpiperazino) alkanols. These new esters are analogous to the morpholinoalkanol esters of our copending application Serial No. 438,114, filed April 8, 1942. Several of the compounds of the present invention show marked hypnotic and sedative properties and are characterized by an extremely low toxicity. Many of the compounds also are useful as modifiers in the vulcanization of natural and synthetic rubber.

These compounds may be represented by the general formula $(R)_x$—Ac in which R represents the group

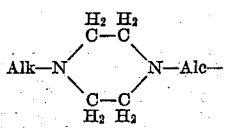

in which Alk may be any lower alkyl radical and Alc is the residue of an aliphatic alcohol, ordinarily but not necessarily containing the same number of carbon atoms as Alk; $x$ is a small whole number and Ac represents a carbocyclic-substituted mono or polybasic aliphatic acyl group. Typical of the acids, the acyl groups of which may be represented by Ac are diphenylacetic, β-β-ditolylpropionic, β-β-phenylbenzylacetic, α-methoxydiphenylacetic, dicyclohexylacetic, diphenylsuccinic, benzilic, β-β-hydroxydiphenylpropionic, tolilic, anisilic, naphthilic, dinaphthylacetic, piperilic and the like. $x$ is normally 1 or 2 although acids containing more than 2 (COOH) groups such as citric acid are within the contemplation of the present invention.

While the esters of the present invention need not necessarily be produced by any particular method, perhaps the easiest procedure to manipulate is the reaction between an acid halide and the N-alkyl, N'hydroxyalkylpiperazine. Where this reaction may be carried out it has a number of advantages. The piperazines, the acid halides and the esters are generally soluble in benzene whereas the hydrohalides of the substituted piperazines are not. Therefore, if the reaction is carried out in benzene, using about 2 equivalents of substituted-piperazine for each equivalent of acid halide, a good reaction rate and excellent yield is obtained because one of the reaction products, the substituted-piperazine hydrohalide, is removed by precipitation. This also enables a ready separation by filtration, the filtrate comprising the ester and solvent. Simple evaporation of the solvent leaves the ester in comparatively pure state. The piperazine hydrohalide is also in a comparatively pure state so that the piperazine is readily regenerated for reuse. The acid halide may be readily formed from the acid, for example by treatment with thionyl chloride. Any halide may be used but since the chlorides are the most common and easiest to obtain they are perhaps to be preferred.

Although the acid halide procedure is perhaps the easiest to use it is not applicable to all acids. For example, the acid chlorides of a diarylhydroxyaliphatic carboxylic acid such as benzilic acid, either can not be prepared or are obtained only with great difficulty in poor yield. Similarly, in the case of certain polybasic acids such as a symmetrical diarylsuccinic acid, treatment in the usual way with thionyl chloride produces anhydrization rather than the acid chloride. In these and similar cases some form of alcoholysis is perhaps the best method of forming the esters since direct esterification is wholly impractical on a commercial basis. While any other procedure may be used, we prefer to form a simple alkyl ester of the desired acid and then carry out a catalyzed ester interchange, removing the replaced alcohol as it is liberated. This process is more fully set forth in the Hill and Holmes application Serial No. 431,822, filed February 21, 1942.

These esters in general are oily liquids insoluble in water and soluble in alcohol and benzene. In general they may be distilled at fairly high temperatures under high vacuum although usually accompanied by some decomposition. They are usually more conveniently handled in the form of a salt such as the hydrochloride which may be easily prepared since the esters themselves are slightly basic in reaction. The hydrochlorides are in general white crystalline salts soluble in water and acetone and generally insoluble in ether. Other salts such as the nitrate, sulfate, phosphate, hydrobromide, citrate, tartrate and the like may be made if it becomes desirable to do so.

Quaternary compounds such as the methiodide, ethobromide, and the like may be prepared. These quaternary compounds have a certain advantage in that they are usually more readily crystallized than are some of the hydrochlorides of high melting point which are often extremely hygroscopic. The quaternary compounds may be readily prepared by treating the base in an alcoholic solution with a compound such as methyl iodide or ethyl bromide and precipitating the salt by removing a portion of the alcohol and adding ether to the residue until precipitation stops. These quaternary compounds have sharp melting points when purified by recrystallization from a suitable solvent such as an acetone-ether mixture.

The present invention will be more fully illustrated in connection with the following examples which are illustrative and not by way of limitation. All parts are by weight unless otherwise noted.

Example 1

β(N'ethylpiperazino)ethanol $$H_3C-H_2C-N\begin{pmatrix}C-C\\H_2\ H_2\\C-C\\H_2\ H_2\end{pmatrix}N-CH_2CH_2OH$$

Piperazine was treated with ethylchlorocarbonate to produce N-carbethoxypiperazine and this product ethylated with ethyl-p-toluenesulfonate. The carbethoxy group was then hydrolyzed off to produce N-ethylpiperazine. The N-ethyl piperazine was then treated with ethylene oxide to give the β(N'ethylpiperazino)ethanol.

Example 2

The procedure of Example 1 was repeated but ethylenechlorohydrin was substituted for the ethylene oxide. The product, β(N'ethylpiperizino)ethanol was identical with that of Example 1.

Example 3

3(N'ethylpiperazino)propanol $$H_3C-H_2C-N\begin{pmatrix}C-C\\H_2\ H_2\\C-C\\H_2\ H_2\end{pmatrix}N-CH_2CH_2CH_2OH$$

The procedure of Example 1 was repeated but 1-3 propylene chlorohydrin was substituted for the ethylene oxide. The product was 3(N'ethylpiperazino)propanol.

Example 4

β(N'methylpiperazino)ethanol $$H_3C-N\begin{pmatrix}C-C\\H_2\ H_2\\C-C\\H_2\ H_2\end{pmatrix}N-CH_2CH_2OH$$

The procedure of Example 1 was repeated but methyl p-toluenesulfonate was substituted for the ethyl p-toluenesulfonate. The product was β(N'methylpiperazino)ethanol.

In a similar manner any desired piperazinoalkanol of the general formula R—OH may be built up, R representing the group $$Alk-N\begin{pmatrix}C-C\\H_2\ H_2\\C-C\\H_2\ H_2\end{pmatrix}N-Alc-$$

in which the substituents have the same meaning given above. Alk may be varied substantially as desired by using the appropriate alkyl-p-toluenesulfonate and Alc may be varied by using the appropriate alkylene oxide or chlorohydrin. If Alc is to be the residue of an n-alcohol however, the chlorohydrin should be used since the alkylene oxides of more than two carbon atoms yield iso-alcohols. The (N'alkylpiperazino)alkanols and the methods of making them form no part of the present invention.

Example 5

β(N'ethylpiperazino)ethyldiphenylacetate $$C_2H_5-N\begin{pmatrix}C-C\\H_2\ H_2\\C-C\\H_2\ H_2\end{pmatrix}N-CH_2-CH_2-O-\overset{O}{\underset{\|}{C}}-\overset{Ph}{\underset{Ph}{C}}-H$$

11.7 parts of diphenylacetyl chloride were dissolved in 50 parts of dry benzene. 15.8 parts of β(N'ethylpiperazino)ethanol were added and the mixture refluxed until there appeared to be no further precipitation, cooled to room temperature and the β(N'ethylpiperazino)ethanol hydrochloride filtered off. The residual benzene was distilled off under reduced pressure and the residue comprising the ester base was a light brown viscous liquid boiling at 222–225° C. at 2 mm.

Example 6

Citrate of β(N'ethylpiperazino)ethyldiphenylacetate $$C_2H_5-N\begin{pmatrix}C-C\\H_2\ H_2\\C-C\\H_2\ H_2\end{pmatrix}N-CH_2-CH_2-O-\overset{O}{\underset{\|}{C}}-\overset{Ph}{\underset{Ph}{C}}-H$$

Citrate 14 parts of the ester base produced as in Example 5 were dissolved in 150 parts of acetone at 50° C. This was slowly added to a hot solution of 7.7 parts of anhydrous citric acid in 100 parts of acetone. Crystallization of the salt began almost immediately and when the addition was completed the mixture was cooled and the crystals removed by filtration. Purification of the crystals by recrystallizing from dry alcohol produced colorless, fluffy needles melting at 143–144° C.

Example 7

β(N'ethylpiperazino)ethyldiphenylacetate hydrochloride $$C_2H_5-N\begin{pmatrix}C-C\\H_2\ H_2\\C-C\\H_2\ H_2\end{pmatrix}N-CH_2-CH_2-O-\overset{O}{\underset{\|}{C}}-\overset{Ph}{\underset{Ph}{C}}-H \cdot HCl$$

A portion of the ester base as produced in Example 5 was dissolved in dry ether and dry hydrogen chloride gas bubbled therethrough until precipitation appeared to have stopped. The precipitate was separated by filtration and purified by recrystallization from an alcohol-acetone-ether mixture as extremely hygoscopic crystals.

*Example 8*

Methobromide of β(N'ethylpiperazino)ethyldiphenylacetate

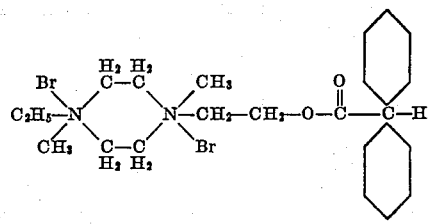

16 parts of the ester base produced in Example 5 were dissolved in 100 parts of dry alcohol and the solution cooled to 0° C. 25 parts of methylbromide were then slowly added and the mixture gently agitated for ½ hour in a sealed vessel, the temperature being held below 20° C. About one-half the alcohol was distilled off and dry ether added slowly until precipitation stopped. The precipitate was collected by filtration and recrystallized from an acetone-ether mixture.

*Example 9*

β(N'ethylpiperazino)ethyl dinaphthylacetate

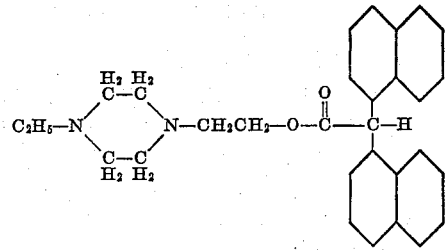

14.8 parts of dinaphthylacetyl chloride were dissolved in 50 parts of dry benzene and 15.8 parts of β(N'ethylpiperazino)ethanol were added thereto and the mixture refluxed until there appeared to be no additional β(N'ethylpiperazino)-ethanol hydrochloride precipitated. The latter was removed by filtration and the remaining benzene distilled off under reduced pressure. The residue, a viscous oil, comprised the ester base.

*Example 10*

3(N'-n-propylpiperazino)propyldiphenylacetate

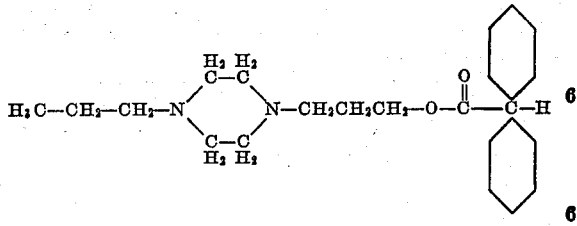

23 parts of diphenylacetyl chloride were dissolved in 100 parts of dry benzene. 37 parts of 3(N'-n-propylpiperazino)-1-propanol were then slowly stirred in and the mixture refluxed until the reaction was substantially completed. The 3(N'-n-propylpiperazino)propanol hydrochloride which precipitated was removed by cooling and filtering. The residual benzene was then evaporated under reduced pressure leaving the ester base as a viscous oil.

*Example 11*

β(N'-n-propylpiperazino)ethyldiphenylacetate

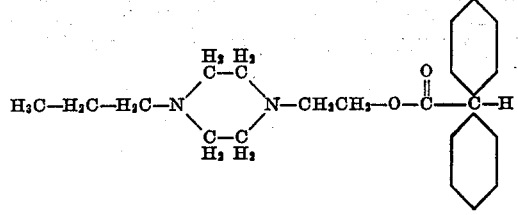

11.7 parts of diphenylacetyl chloride were dissolved in 50 parts of dry benzene. 17.2 parts of β(N'-n-propylpiperazino)ethanol were added and the mixture refluxed until there appeared to be no further precipitation, cooled to room temperature and the β(N'-n-propylpiperazino)ethanol hydrochloride filtered off. The residual benzene was distilled off under reduced pressure and the residue comprised β(N'-n-propylpiperazino)ethyldiphenylacetate.

*Example 12*

β(N'ethylpiperazino)ethyldicyclohexylacetate

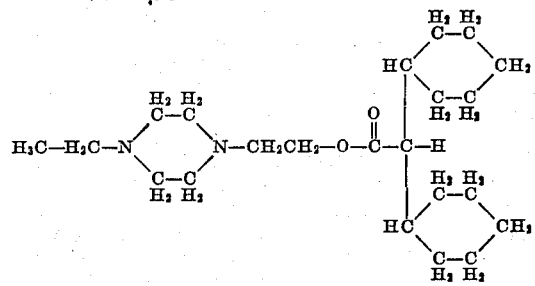

12.4 parts of dicyclohexylacetyl chloride were dissolved in 60 parts of dry benzene and 15.8 parts of β(N'ethylpiperazino)ethanol were added thereto and the mixture refluxed until there appeared to be no additional β(N'ethylpiperazino)ethanol hydrochloride precipitated. The latter was removed by filtration and the ramining benzene distilled off under reduced pressure. The residue comprised β(N'ethylpiperazino)ethyldicyclohexylacetate.

*Example 13*

β(N'ethylpiperazino)ethyl-β,β-di-p-tolylpropionate

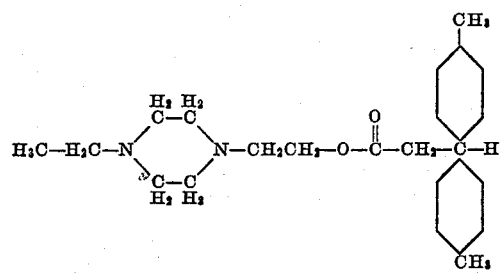

27.4 parts of β,β-di-p-tolylpropionylchloride were dissolved in 100 parts of dry benzene. 31.5 parts of β(N'ethylpiperazino)ethanol were then slowly stirred in and the mixture refluxed until the reaction was substantially completed. The residual benzene was then evaporated under reduced pressure leaving β(N'ethylpiperazino)ethyl-β,β-di-p-tolylpropionate.

While the preceding examples have been made by the reaction of an acid chloride and a substituted piperazine, as pointed out above, it is not applicable in the cases of hydroxy-acids such as benzilic and dibasic acids such as symmetrical diphenylsuccinic acid and the like. In such cases, as was pointed out above, an alcoholysis is the best method of forming the desired products. Our preferred procedure in such cases is illustrated, although not necessarily limited, by the following examples. All parts are by weight.

*Example 14*

β(N'ethylpiperazino)ethylbenzilate dihydrochloride

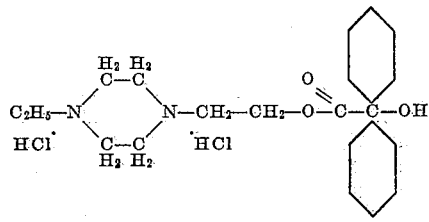

115 parts of ethyl benzilate, 175 parts of β(N'ethylpiperazino)ethanol and 0.2 part of metallic sodium were placed in a flask attached to a total-reflux variable take-off fractionating column. The pressure was reduced to 100 mm. and heat was applied by an oil bath the temperature of which was slowly raised to 90° C. During three hours of heating 17 parts of ethanol distilled (35.5° C.). When the distillation of the ethanol became slow, the bath temperature was raised to 120° C. When the vapor temperature indicated distillation of the aminoalcohol, the take-off valve was closed and the mixture was refluxed until the vapor temperature had dropped and two more parts of ethanol were distilled. The remaining unreacted aminoalcohol was slowly distilled off until it stopped and pressure was then reduced to 20 mm. and the final residual aminoalcohol distilled at about 70° C. During the reaction the color of the solution changed from yellow to deep red. The residue was dissolved in 500 parts of ether, washed once with dilute brine, and three times with water, dried over sodium sulfate and finally dried over calcium sulfate. 500 parts of a saturated solution of HCl in absolute ether were added and the resulting precipitate filtered. Dry HCl gas was passed into the filtrate to a slight excess and the precipitate again filtered. The combined precipitates were washed with cold acetone. The product was purified by recrystallization from acetone as fine white crystals.

*Example 15*

Di(β[N'ethylpiperazino]ethyl)diphenylsuccinate

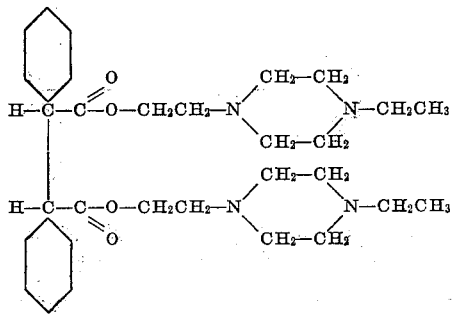

To a solution of .2 part of sodium in 105 parts of β(N'ethylpiperazino)ethanol were added 33 parts of diethyldiphenylsuccinate and the mixture heated at about 145° C. until the reaction stopped, at the end of which period the excess β(N'ethylpiperazino)ethanol was distilled off under reduced pressure. The oily residue was twice extracted with dilute hydrochloric acid. The acid extract was washed twice with ether and a sodium carbonate solution until a precipitate formed. The precipitate was filtered out, extracted with ether and the extract added to the filtrate, the combination being dried over sodium sulfate, filtered, and the residual ether distilled off at atmospheric pressure. The residue was di(β[N'ethylpiperazino]-ethyl) diphenylsuccinate.

We claim:

1. A chemical compound selected from the group consisting of the (N'alkylpiperazino) alkyl esters and water-soluble salts thereof, which esters have the structural formula

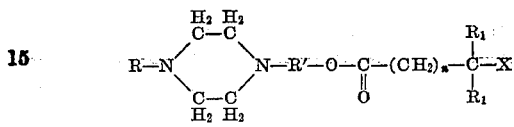

wherein R is a lower alkyl radical, R' is a divalent lower unsubstituted aliphatic hydrocarbon radical, $R_1$ is a substituent selected from the group consisting of aryl and cyclohexyl radicals, X is a substituent selected from the group consisting of hydrogen, hydroxy and alkoxy groups, and $n$ is selected from the figures consisting of 0 and 1.

2. A chemical compound selected from the group consisting of the (N'alkylpiperazino) alkyl esters and water-soluble salts thereof, which esters have the structural formula

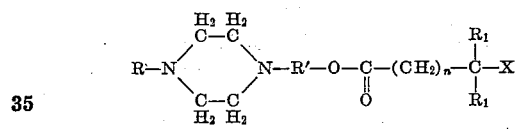

wherein R is a lower alkyl radical, R' is a divalent lower unsubstituted aliphatic hydrocarbon radical, $R_1$ represents a mononuclear aryl radical, X is a substituent selected from the group consisting of hydrogen, hydroxy and alkoxy groups, and $n$ is selected from the figures consisting of 0 and 1.

3. A chemical compound selected from the group consisting of the (N'alkylpiperazino) alkyl esters and water-soluble salts thereof, which esters have the structural formula

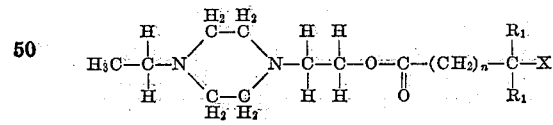

wherein $R_1$ represents a mononuclear aryl radical, X is a substituent selected from the group consisting of hydrogen, hydroxy and alkoxy groups, and $n$ is selected from the figures consisting of 0 and 1.

4. A chemical compound selected from the group consisting of the (N'alkylpiperazino) alkyl esters and water-soluble salts thereof, which esters have the structural formula

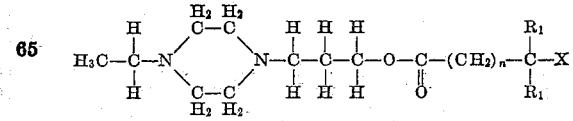

wherein $R_1$ represent a mononuclear aryl radical, X is a substituent selected from the group consisting of hydrogen, hydroxy and alkoxy groups, and $n$ is selected from the figures consisting of 0 and 1.

5. A chemical compound selected from the group consisting of the (N'alkylpiperazino) alkyl esters and water-soluble salts thereof, which esters have the structural formula

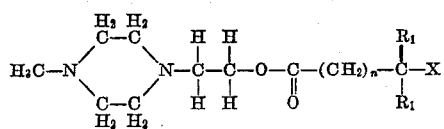

wherein $R_1$ represents a mononuclear aryl radical, X is a substituent selected from the group consisting of hydrogen, hydroxy and alkoxy groups, and $n$ is selected from the figures consisting of 0 and 1.

ELMORE HATHAWAY NORTHEY.
MARTIN EVERETT HULTQUIST.

REFERENCES CITED

The following references are of record in the file of this patent:

UNITED STATES PATENTS

| Number | Name | Date |
|---|---|---|
| 2,262,357 | De Groote | Nov. 11, 1941 |
| 2,262,358 | De Groote | Nov. 11, 1941 |
| 2,079,962 | Miescher | May 11, 1937 |
| 2,260,967 | Bruson | Oct. 28, 1941 |
| 2,089,212 | Kritchevsky | Aug. 10, 1937 |

FOREIGN PATENTS

| Number | Country | Date |
|---|---|---|
| 698,687 | French | 1931 |

OTHER REFERENCES

Chem. Abstracts, vol. 24, p. 2750. (Copy in Div. 6.)

Chem. Abstracts, vol. 29, p. 7986. (Copy in Div. 6.)